US008296305B2

(12) United States Patent
Vasudevan et al.

(10) Patent No.: US 8,296,305 B2
(45) Date of Patent: Oct. 23, 2012

(54) RULES AND METHOD FOR IMPROVING IMAGE SEARCH RELEVANCE THROUGH GAMES

(75) Inventors: Sudharsan Vasudevan, Karnataka (IN); Nangavaram Sundararajan Sekar, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 502 days.

(21) Appl. No.: 12/331,358

(22) Filed: Dec. 9, 2008

(65) Prior Publication Data

US 2010/0145941 A1 Jun. 10, 2010

(51) Int. Cl.
G06F 7/00 (2006.01)
G06F 17/30 (2006.01)
G06F 15/16 (2006.01)
(52) U.S. Cl. .......................................... 707/749; 707/915
(58) Field of Classification Search .................. 707/749, 707/915
See application file for complete search history.

(56) References Cited

U.S. PATENT DOCUMENTS

| 7,693,906 B1* | 4/2010 | Amidon et al. | 707/749 |
| 7,886,024 B2* | 2/2011 | Kelly et al. | 707/749 |
| 8,032,483 B1 | 10/2011 | Haveliwala et al. | |
| 2002/0052861 A1* | 5/2002 | Gustman | 707/1 |
| 2003/0105746 A1* | 6/2003 | Stickler | 707/3 |
| 2005/0190273 A1* | 9/2005 | Toyama et al. | 707/104.1 |
| 2005/0257137 A1* | 11/2005 | Weber et al. | 715/512 |
| 2006/0031486 A1* | 2/2006 | Miner | 709/224 |
| 2007/0094263 A1* | 4/2007 | Tessman et al. | 707/9 |
| 2007/0185858 A1* | 8/2007 | Lu et al. | 707/5 |
| 2008/0120328 A1* | 5/2008 | Delgo et al. | 707/102 |
| 2009/0123021 A1* | 5/2009 | Jung et al. | 707/102 |
| 2010/0114933 A1* | 5/2010 | Murdock et al. | 707/765 |

OTHER PUBLICATIONS

Google Image Labeler (2007) downloaded from the Internet on Feb. 20, 2009 < http://images.google.com/imagelabeler/ > 1 page.

* cited by examiner

Primary Examiner — Tony Mahmoudi
Assistant Examiner — Brian E. Weinrich
(74) Attorney, Agent, or Firm — Hickman Palermo Truong Becker Bingham Wong LLP

(57) ABSTRACT

An application conforming to a set of rules is described for improving the accuracy of results provided by image search engines through identifying images as true positive hits, true negatives, false positive hits, and false negatives. The set of rules comprise: (1) causing players to associate given images with given metadata; (2) associating a player with a skill level; (3) utilizing measures of accuracy and time; (4) causing players to select a few images from a relatively large pool of images; and (5) testing player tolerance. An application that conforms to these rules tests the relevancy of images to given metadata tags. The application provides information that is the basis for adjusting the metadata associated with the tested images so as to improve the relevancy of image search results lists that include these images.

34 Claims, 13 Drawing Sheets

100

200

Drag and drop the image that is most related to "MOUNTAIN" into the box:

300

511
Highlight two images
that are related to:

510 "LANDSCAPES"

501

502

503

504

505

506

507

508

509

500

711
Highlight only *one* image
that is *best* related to:

710 "LANDSCAPES"

701

702

703

704

705

706

707

708

709

700

811
Highlight only *one* image
that is *best* related to:

810 — "LANDSCAPES"

801

802

803

804

805

806

807

808

809

800

RULES AND METHOD FOR IMPROVING IMAGE SEARCH RELEVANCE THROUGH GAMES

FIELD OF THE INVENTION

The present invention relates to improving the relevance of metadata associated with images through identifying false negatives, false positives, true negatives, and true positives, and more specifically, to an application that conforms to a set of rules formulated to identify false negatives, false positives, true negatives, and true positives.

BACKGROUND

An abundance of information is available via the Internet. Users can direct web browser applications, such as Mozilla Firefox, to various Uniform Resource Locators (URLs) in order to view content that is associated with those URLs. In order to assist users in locating certain kinds of content for which the users do not know the associated URLs, various Internet search engines have emerged. Yahoo! Inc. is the owner and operator of one of these Internet search engines.

A user can enter a set of query terms into an Internet search engine's user interface. The Internet search engine receives the query terms and searches an index for known content items that are associated with the query terms. The Internet search engine creates a list of content items that are relevant to the submitted query terms. The Internet search engine returns the list to the user.

When the first Internet search engines emerged, the results returned by the search engines were hyperlinks to web pages that those search engines deemed to be relevant to the user-supplied query terms. Typically, a web page that contained the query terms was deemed to be relevant. Along with those hyperlinks, some search engines returned textual abstracts or blurbs that gave the query term-submitting user a hint as to the content of the page, and the context in which the query terms were used in the page.

Later, more advanced Internet search engines allowed a user to indicate that the search was to be performed specifically relative to images that were available on the Internet. These search engines indexed the images that they found (via web crawling) on the Internet. A user who wanted to search for images pertaining to a certain phrase could supply that phrase as a set of query terms to the search engine, and instruct the search engine to return images. In other words, the user would instruct the search engine to search the "image vertical"—a subset of the entire Internet—rather than the Internet generally. Alternatively, the image search engine might be part of an application with the purpose of organizing and sharing images. One example of an application that includes an image search engine is Flickr™, which is owned by Yahoo! Inc.

The task of an image search engine is to determine which of the available images are most relevant to the user-submitted query terms. Search engines use metadata associated with the images to identify image content and to evaluate the relevance of an image to the user-submitted query terms. Metadata associated with images can be inherent to the image, and metadata associated with an image can also be provided by users to explain the content of the image. For example, FIG. 1 shows an image of a mountain 100. However, if the image 100 is not tagged as a "mountain," or associated with the metadata "mountain" in any way, then a search engine that relies on metadata to gauge the content of image 100 will not associate image 100 with a mountain.

Therefore, images that are explicitly associated with metadata describing the image's content allow a search engine to properly associate the image with a relevant search query. One method of associating images with metadata is to request that users tag images with words that the users deem to be relevant to the images. However, if users are careless with the tags they choose for a particular image or if users purposefully associate an image with erroneous tags, search engines will not associate the image with its true content, but with the faulty metadata provided by the users. For example, if the image 100 in FIG. 1 is a photograph taken by a user on her way to her favorite theme park, she may tag the image as a "theme park." This tag would lead a search engine to erroneously provide this picture 100 of a mountain in response to a user-provided search query for "theme parks." Another reason images are incorrectly tagged is to boost the apparent relevance of the image in a greater number of search results. If the image 100 of a mountain in FIG. 1 is associated with the tags "mountain," "snow," and "grass," the image will be displayed in the search results for queries associated with "mountain," "snow," and "grass." However, if a user wished more people to see the image, the user might tag the image with popular search query terms such as "Brad Pitt," "Barack Obama," or "Britney Spears"—though the image is not truly relevant to any of those terms—which would cause the image to be displayed to users in response to a wider variety of search queries.

Another method of relating images with metadata is to glean the information from the context of an image on a web page. Information about an image can be taken from the title or content of the web page or the HyperText Markup Language (HTML) tags around the image in an HTML web page. For example, if image 100 is found by the search engine on a blog about mountains, the search engine might associate image 100 with "mountains." However, many times the context of an image on a web page can be misleading as to the true content of the image. For example, if image 100 is found on a web page about theme parks, the search engine might erroneously associate the image with "theme parks."

Furthermore, it is advantageous to order the results of a search query by relevance to the search query because the most relevant information is then presented to the client at the beginning of the search results list. Thus, it is not only important to know that an image is relevant to a search query, but it is also important to know to what degree an image is relevant to the search query. One method of determining whether an image is of high relevance to the metadata associated with the image is to gauge the quality of the image based on its source or the fact that the image was explicitly tagged by a user. However, this method can create inaccurate relevancy determinations because of the lack of strong correlation between source of the image and the true relevance of the image to its associated metadata. Furthermore, as discussed above, an image that is explicitly tagged still may not be highly relevant to the metadata with which the image was tagged.

Another method of determining the relevancy of an image involves measuring the freshness of the image, or how much time has passed since the image was uploaded. If an image is only an hour old, it may be regarded as more freshly associated to its tagged metadata than an image that is a week old. Again, the problem with this method is that the metadata associated with the image may not be accurate to begin with. Yet another method of determining the relevancy of an image to its tagged metadata is how often users click on the image when the image is presented to the users in a search results set for a particular search query. If an image is clicked on frequently when presented in the results list for a particular search query, the image is considered to be highly relevant to the topic of the search query. However, this method does not take into account the possibility that the image may be clicked on frequently because it holds an interest for the users outside of the image's relevance to the topic of the search query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, an application is described with the objective of improving the accuracy of image search results. This improvement is accomplished through four sub-objectives: (1) identifying false positives, or those images that are not associated with topic A, but that are tagged with metadata associating the images with topic A; (2) identifying false negatives, or those images that are associated with topic B, but that are not tagged with metadata associating the images with topic B; (3) refining true positives to ascertain relative relevancy amongst the true positives; and (4) validating true negatives.

Figure 1:
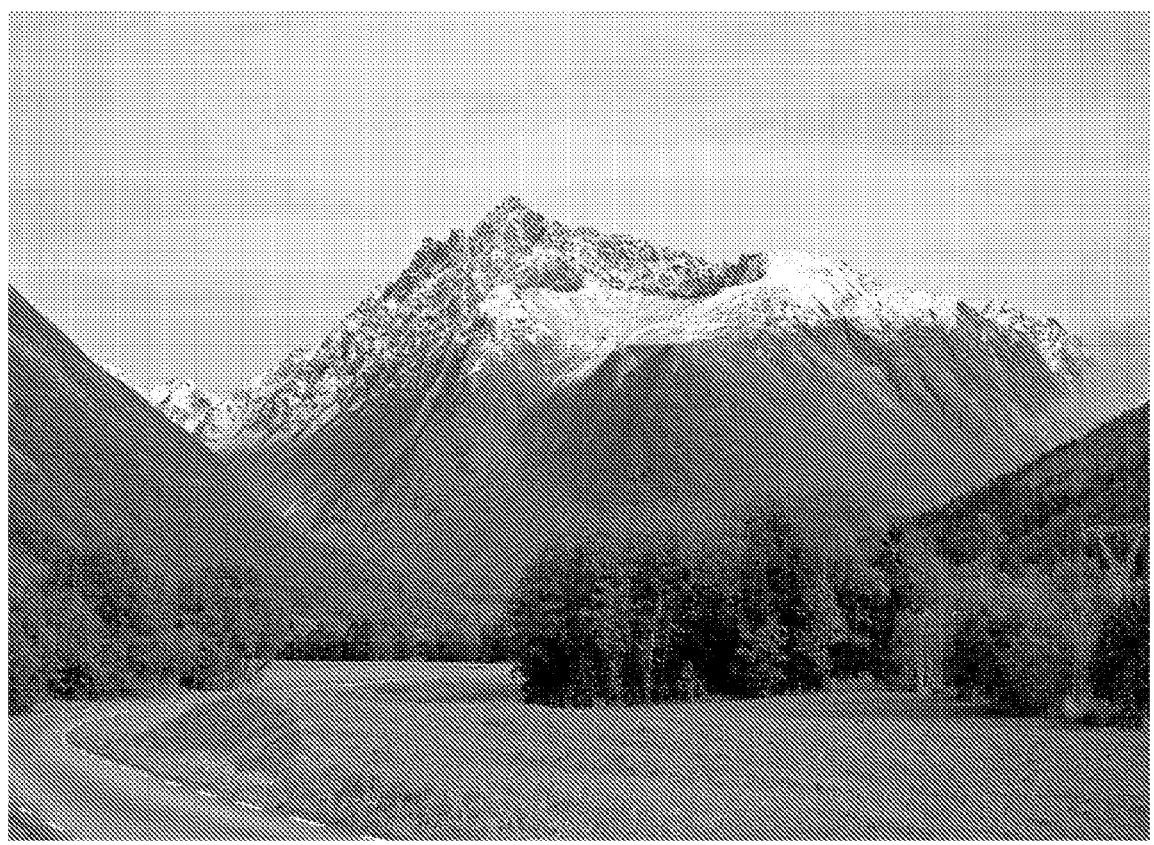
FIG. 1 illustrates an example image that might be found through an image search engine.

False positives are images that are tagged with metadata information to which the image is not relevant. For example, image 100 of FIG. 1 would be a false positive if the image were associated with the metadata tag "candy" because image 100 is of a mountain and has no logical relevance to "candy." Such a poorly tagged image can create inaccurate image search results because an image search engine would include image 100 in a search result list for a search query on "candy,"

and it is highly unlikely that a user would consider image 100 relevant to that search criteria. Therefore, by identifying false positives and correcting poorly associated metadata tags, the accuracy of an image search results list is improved.

False negatives are images that are relevant to a particular topic, but that are not tagged with the metadata indicating the particular topic. For example, image 100 is associated with the metadata tags "trees," "grass," and "snow," all of which are actually relevant to image 100. Image 100 is not associated with the tag "mountain." Therefore, image 100 would be a false negative if the image is not included in a search results list on the query "mountain" because a user conducting such a search would likely find image 100 to be highly relevant to the search. Identifying such false negatives and associating the false negative images with relevant metadata tags increases the accuracy of the results produced by an image search engine.

Figure 2:
FIG. 2 illustrates another example image that might be found through an image search engine.

True positives are images that are tagged with relevant metadata tags. Image 100 of FIG. 1 and image 200 of FIG. 2 are true positives if the images are tagged with the metadata "mountain" and are returned in a search results list for the term "mountain" because a user would likely find images 100 and 200 to be relevant to the search. However, the accuracy of an image search engine's search results can be improved if the degree of relevancy of true positives can be ascertained. For example, an average user would likely find that image 100 is more relevant to the term "mountain" than image 200 is because the mountain of image 100 is more pronounced and more detailed than the distant mountain range depicted in image 200. Therefore, while both images 100 and 200 are relevant to "mountain," one image is more relevant than the other image, and if the search results list is ordered by relevancy, then image 100 should be displayed before image 200. As such, ascertaining the relative relevancy of images to a particular metadata tag increases the accuracy of an image search engine's results list.

True negatives are images that are not tagged with a particular topic and are not related to the particular topic. Image 100 is a true negative if it is not tagged with the metadata "candy," and is not returned in a search results list based on the term "candy." The accuracy of an image search engine's search results list is improved if true negatives are validated, especially with respect to differentiating false negatives from true negatives.

The Rules

To accomplish these purposes, one embodiment of the invention is an application created according to a set of rules designed to accomplish the objectives outlined above, which are: (1) identifying false positives; (2) identifying false negatives; (3) ascertaining relative relevancy of true positives; and (4) validating true negatives. As such, this application increases the accuracy and relevancy of the metadata associated with images, which allows an image search results engine to produce more accurate search results lists.

In one embodiment, the application is in the form of a game. After a user plays the game, feedback based on the decisions the user made in the course of playing the game is used to improve the relevancy of image search results. The rules described below, which are formulated to accomplish the outlined objectives, are illustrated in the context of a game application. In one embodiment of the invention, the application conforms to only one of the following rules. In another embodiment of the invention, the application conforms to more than one of the rules. Those of skill in the art will understand that the application need not be in the form of a game to conform to the embodiments of the invention.

In another embodiment of the invention, five rules are utilized to perform the objectives of the application. These rules are: (1) cause players to associate given images with given metadata; (2) associate a player with a skill level; (3) utilize measures of accuracy and time; (4) cause players to select a few images from a relatively large pool of images; and (5) test player tolerance. Through an application that implements one or more of these rules, metadata associated with images can be improved, giving more accurate image search results.

Rule 1

Cause Players to Associate Images with Given Metadata

Figure 3:
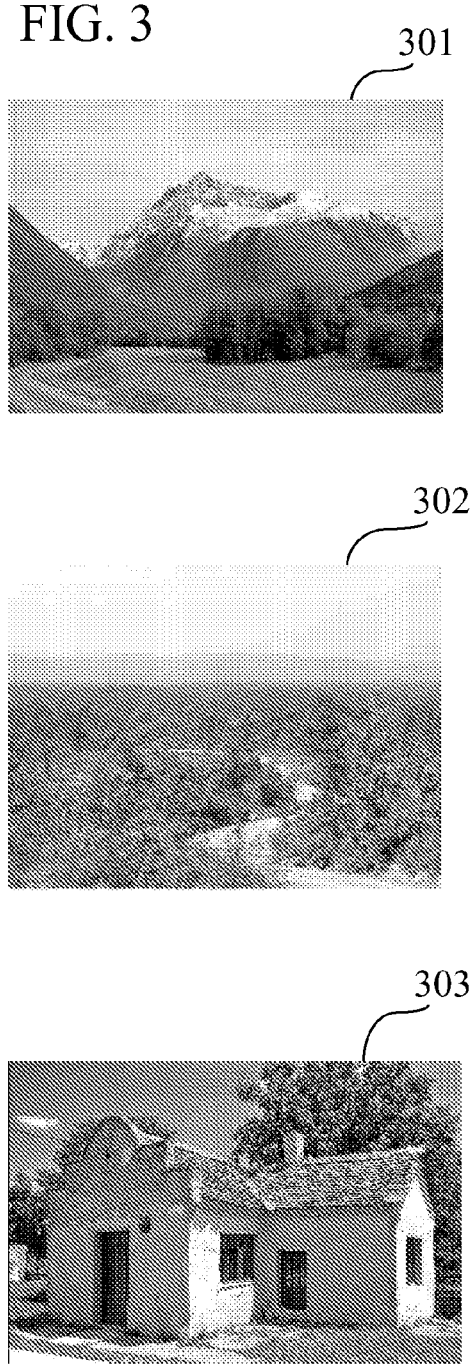
FIGS. 3-8 are example applications illustrating game applications created according to the embodiments of the invention.
Figure 3:

The first rule involves causing players of the game to associate a given image or set of images to given tags or images, as in game application 300 of FIG. 3. This first rule is important in increasing the accuracy and relevancy of metadata associated with images. Game application 300 provides a set of three images 301, 302, and 303, and gives instructions 310 to the player to drag and drop the image into the box 312 that is most related to the given metadata tag, "mountain." Because of the configuration of game application 300, a player will likely associate the image that is most highly relevant to the tag "mountain" with the given metadata tag. It will be apparent to those of skill in the art that instructions provided by an application conforming to the embodiments of the invention can be explicit—i.e., words explaining the instructions, or icons explaining the instructions—or the instructions can be implicit—i.e., the configuration of the application suggests to the user a set of instructions.

Because both the set of images 301, 302, and 303 and the metadata tag, "mountain," are provided to a user of the application, there is a low probability that the user will associate an image with an irrelevant tag. In application 300, there is little chance that a user will associate an image with a tag in order to boost the number of times the image will appear in search results because the tags are provided to the user, and the generally setup of application 300 is a game. Also, the fact that the metadata tags and images are provided to the user in game application 300 prevents incidental or careless mistagging of images. Thus, if a set of images is displayed to a user and the user is asked to associate one or more images with given metadata, then the probability of accurate associations between images and metadata is increased.

Furthermore, as more players associate a particular image with a particular set of given tags or images, the relevance of the particular image to the tags or images is proven to be stronger. Thus, the search engine has better information about the relevancy of true positives. For example, if image 301 is associated with "mountain" more frequently than images 302 or 303 are, then image 301 is very likely to be more relevant to the tag "mountain" than images 302 and 303 are.

In one embodiment of the invention, a player is asked to choose, from a collection of displayed images, one image to associate to one given metadata tag or one given image. This is the configuration of game application 300 in FIG. 3. As described above, this particular embodiment of the invention can be used to investigate the relevancy of true positives. When a user can only choose one image to associate with a given metadata tag, as in game application 300, the user is likely to select only the most relevant image to associate with the given tag. Continuing with the example of described above, if image 301 is the image that has been most frequently associated with "mountain," and image 301 is already tagged with the metadata "mountain," then the image is a strong true positive with regard to that search term. It follows that if images 302 and 303 are also tagged with "mountain," then image 301 is more relevant to "mountain" than images 302 and 303 are because image 301 has been associated with "mountain" more often than the other images 302 and 303 have been. After many players have played game application 300, the search engine will know which images are most relevant to "mountain" and which images are less relevant.

The embodiment of the invention shown in game application 300 can also be used to identify false negatives—when a particular image is relevant to a given metadata tag or image, but is not tagged as such. For example, image 302 is tagged only with "trees," and "path" and is selected by a number of players of game application 300 as being associated with "mountain." The association the players made between image 302 and "mountain" implies that the image is also relevant to the tag "mountain." If the number of players that associate image 302 with "mountain" passes a specified threshold, then image 302 is identified as a false negative, because without being tagged with the metadata "mountain," image 302 would not be included in a search results list for a query on "mountain." However, as described above, if image 301 is associated with "mountain" significantly more often than image 302 is, then image 301 will be found to be more relevant to "mountain" than image 302 is.

Furthermore, games such as game application 300 are useful to identify false positives, which are images that are tagged as relevant to topic A, but that are not actually relevant to topic A. For example, image 303 is tagged with "house, "trees," and "mountain." If players seldom or never associate image 303 with "mountain," even after image 303 has been presented many times, then this lack of association implies that image 303 is not very relevant to "mountain," especially when compared to the other images that were selected by players. Thus, image 303 is determined to be a false positive, and an image search engine should not include image 303 in the results of a search for "mountain."

Figure 4A:
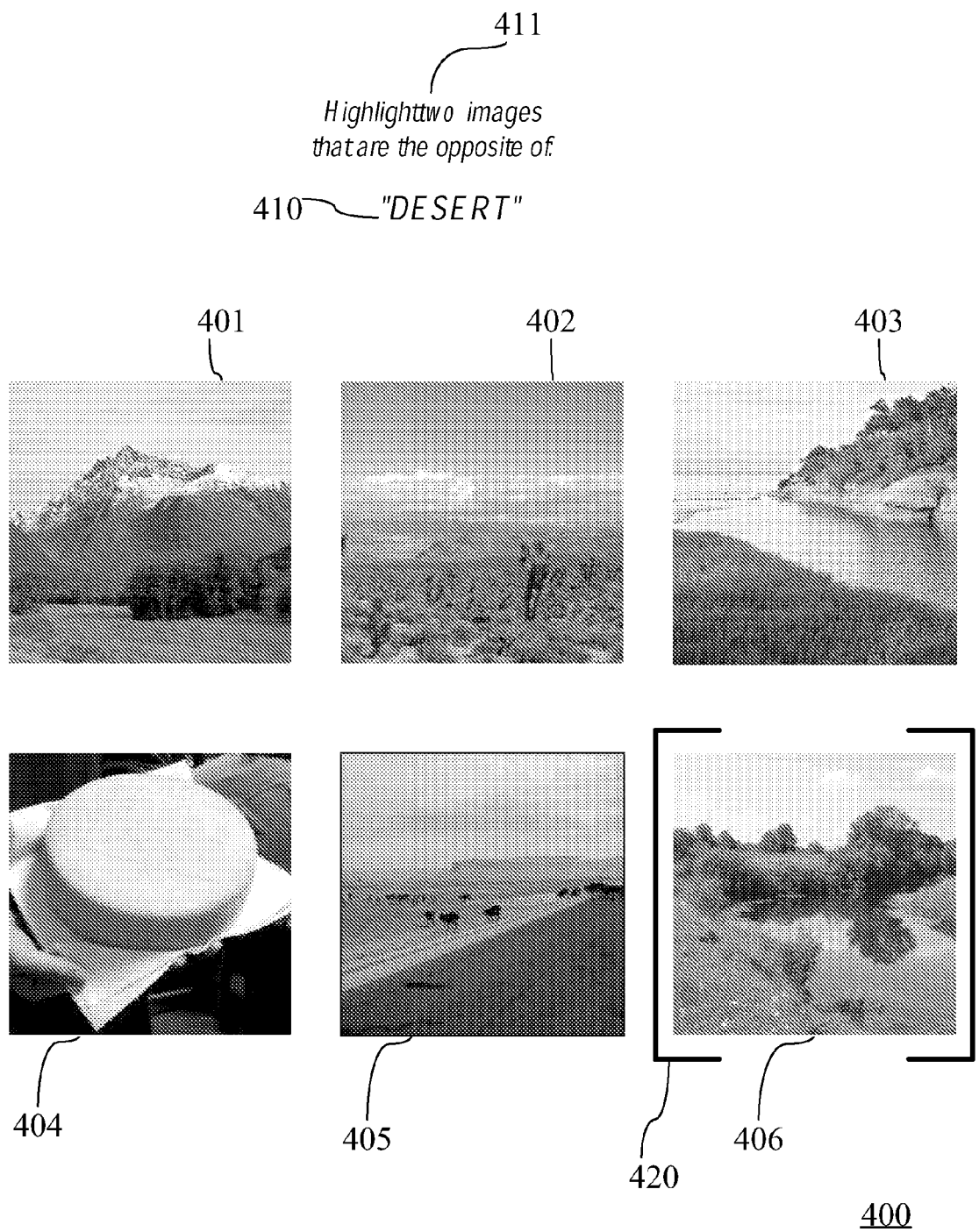

In another embodiment of the invention, the player is asked to associate a particular image with a set of given tags or images, as in game application 400 in FIG. 4A. Game application 400 gives the player instructions 411 to highlight two images that are the "opposite" of metadata tag "desert" 410. As a reference, image 406 is indicated as highlighted 420. For the present example, images 401-406 are tagged as being associated with at least one of the tags "desert," "water," "trees," and "jungle." When asked to highlight images that are the "opposite" of the desert, a player will naturally gravitate to those images portraying "water," "trees," and "jungle." Thus, the images selected by the player in this scenario very likely will be relevant to one of "water," "trees," and "jungle." As with the previous embodiments of the invention, this embodiment involves associating images with metadata according to Rule 1 outlined above. In another embodiment of the invention, those images selected by the player as the "opposite" of desert are further presented to users in games designed to investigate which specific metadata tag is highly relevant to each particular image. It will be appreciated by those of skill in the art that applications according to the embodiments of the invention can be constructed to test many different associations between images and ideas, without limitation on the form of the instructions.

The embodiment of the invention as shown in game application 400 in FIG. 4A can be used to identify false negatives, that is, when an image associated with a given metadata tag is not tagged with the given tag. For example, if image 406 is not tagged as being associated with "water," "trees," or "jungle," and players of game application 400 frequently indicate that image 406 is an "opposite" of "desert," then a system implementing game application 400 can deduce that image 406 is probably associated with "water," "trees," or "jungle," even though image 406 is not tagged as such. Therefore, image 406 is identified as a false negative.

Figure 4B:
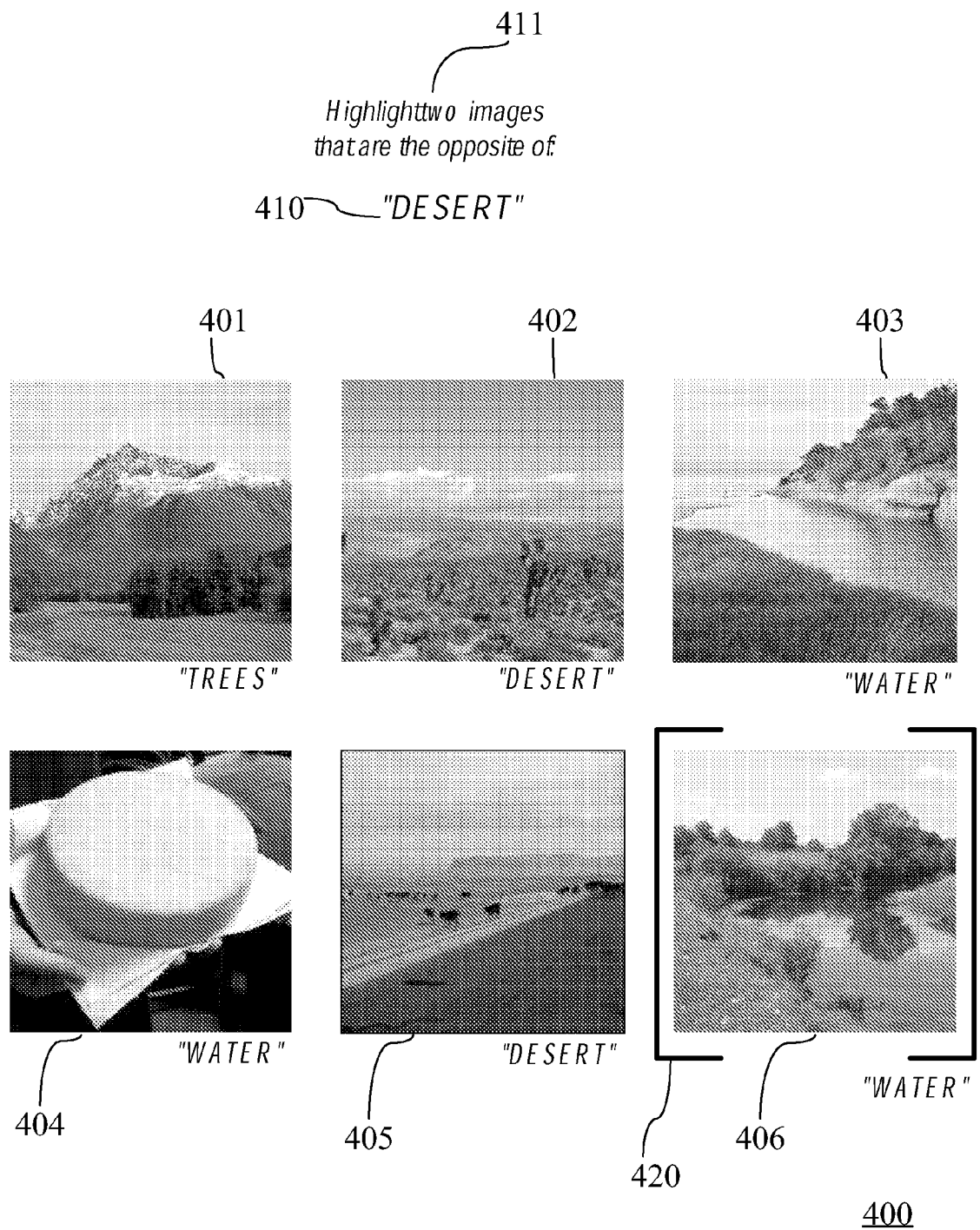

Also, the embodiment of the invention demonstrated by game application 400, as shown in FIG. 4B, can be used to identify false positives, which are images associated with a given tag, but not truly relevant to the given tag. For example, a player is presented with images 401-406 in game application 400. As indicated in FIG. 4B, image 401 is tagged with "trees," image 402 is tagged with "desert," image 403 is tagged with "water," image 404 is tagged with "water," image 405 is tagged with "desert," and image 406 is tagged with "water." The player recognizes images 402 and 405 to be relevant to the desert, and images 401, 403, and 406 to be truly related to water and trees. However, the player will not recognize image 404 as being relevant to desert, trees, water, or jungle, because image 404 is a picture of cheese, though image 404 is tagged with the metadata "water." When the player is asked to identify the "opposite" of desert, image 404, which is tagged with the metadata "water," will rarely or never be selected as the "opposite" of the desert. Thus, the application can use the fact that players never associate image 404 with the "opposite" of the "desert" to infer that image 404 is a false positive with respect to "water." Also, this same example identifies some true positives. Because game application 400 requests that the player identify the opposite of "desert," those images that are tagged as "desert," like images 402 and 405, that are never or rarely chosen as the "opposite" of "desert" are confirmed to be true positives.

Furthermore, the embodiment of the invention illustrated by game application 400 can be used to investigate the relevance of a true positive image with respect to a particular tag associated with the image. For example, if image 403 is associated with the metadata tag "water" and, additionally, the metadata tag "trees," and if image 403 is associated by players with "water" more than with "trees," then image 403 likely has higher relevance to "water" than to "trees."

Rule 2

Associate a Player with a Skill Level

The skill level of a player identified by an application conforming to the embodiments of the invention can influence the inferences that the application draws from the player's performance in a game. Skill level can be based on any of the following: (1) the frequency with which the player plays a particular game, (2) the number of images that the player has identified as erroneously tagged, (3) the number of images that the player has identified as correctly tagged, and (4) the area of expertise of the player, either based on the skill with which the player has played particular games, or based on information provided by the player. In one embodiment of the invention, the associations made by a player with a high identified skill level are given greater weight than associations made by players with less skill level identified by the application.

As a player plays a particular game with greater frequency, the player is more likely to be skillful in selecting images that are relevant to a given metadata tag as presented in the game. This particular aspect of skill level is useful to improve the relevancy score of true positive images. For example, as a player acquaints herself with the subject matter of a game, the player can more easily discern the content of an image, which, at first glance looks to be associated with a "forest" tag, but which is actually an image of a green couch.

Furthermore, if a player has successfully identified a large number of images as tagged with metadata that is not particularly relevant to the images, the player's identification of images as erroneously tagged is given greater weight. For example, if such a player is presented with a set of images several times and is asked to associate the images with a particular metadata tag, the fact that the player never selects a particular image can be used to infer that the image has little or no relevance to the given tag. Also, if the player frequently associates a particular image with a given tag and the particular image is not tagged with the given tag, then the application can infer that the image is a false negative, and is actually relevant to the given tag. As a corollary, if the player associates an image with a given metadata tag and the image is tagged with the given metadata tag, the application might infer that the image is a true positive that is highly relevant to the given tag.

If a player has successfully identified a large number of images as correctly tagged with metadata, the associations between images and metadata that the player makes can be given a relatively greater weight. For example, if a player is highly accurate in playing a game that asks the player to associate images with a "Cars" tag, then the fact that the player associates a particular image with "Cars" more frequently than the other images presented to the player indicates that the particular image is more relevant to the tag "Cars" than the other images.

A player's area of expertise can also influence the weight placed on the player's image associations. A player's area of expertise can be based on the skill with which the player has previously played games of a similar type or topic. Such skill can be measured using the other methods of measuring skill level mentioned above. A player's area of expertise can also be based on information provided by the player, for example, in questionnaires or in a player-created profile.

In general, a player who plays a game within the player's area of expertise can help improve the relevancy rating of true positives because a player who is skilled at a certain category is likely to correctly associate images from the category with relevant metadata tags within the category. For example, a player that is skilled in a "Movies" category is likely to play a game based on "Movies" with greater-than-normal accuracy. As such, the associations that the player makes with respect to the "Movies" category will carry a greater-than-normal weight.

Rule 3

Utilize Measures of Accuracy and Time

A game that incorporates measures of time and player accuracy will cause players to perform more exactly the objective of the embodiments of the invention, which is to increase accuracy of search results through identifying (1) true positives, (2) true negatives, (3) false positives, and (4) false negatives.

Figure 5:
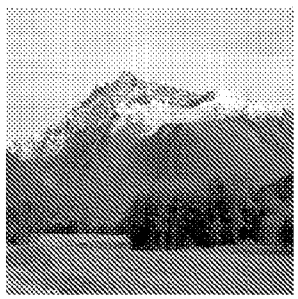
Figure 5:
Figure 5:
Figure 5:
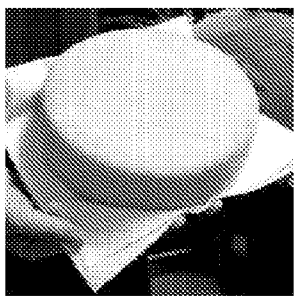
Figure 5:
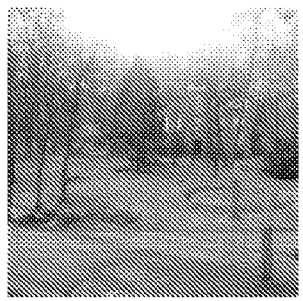
Figure 5:
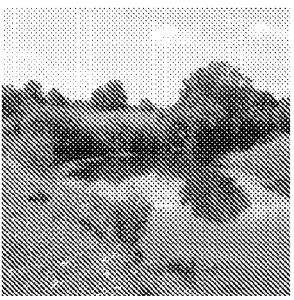
Figure 5:
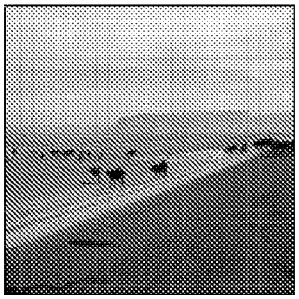
Figure 5:
Figure 5:
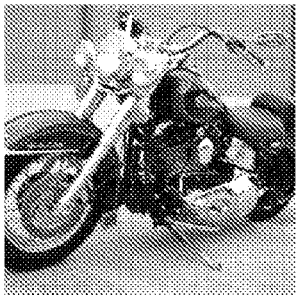

Displaying measures of player accuracy to the player can increase the player's motivation to correctly indicate the relevance of given images to given metadata tags. In one embodiment of the invention, the game introduces a set of images into the game that are believed to be relevant to a given tag and another set of images that are believed to not be relevant to the given tag, as in game application 500 in FIG. 5.

For example, game application 500 gives instructions 511 to the player to highlight two images in the set that are related to metadata tag "landscapes" 510. The set of images in game application 500 consists of several images that could be relevant to "landscapes," like images 501, 502, 505, 506, 507, and 508. The rest of the images in game application 500 are not relevant to landscapes, and can be placed in the image set of game application 500 purposefully as "noise." This noise introduces an element of challenge into the game, which induces players to sort through the given images 501-509 to associate only those images that are truly relevant to "landscapes" with this tag.

Figure 6:
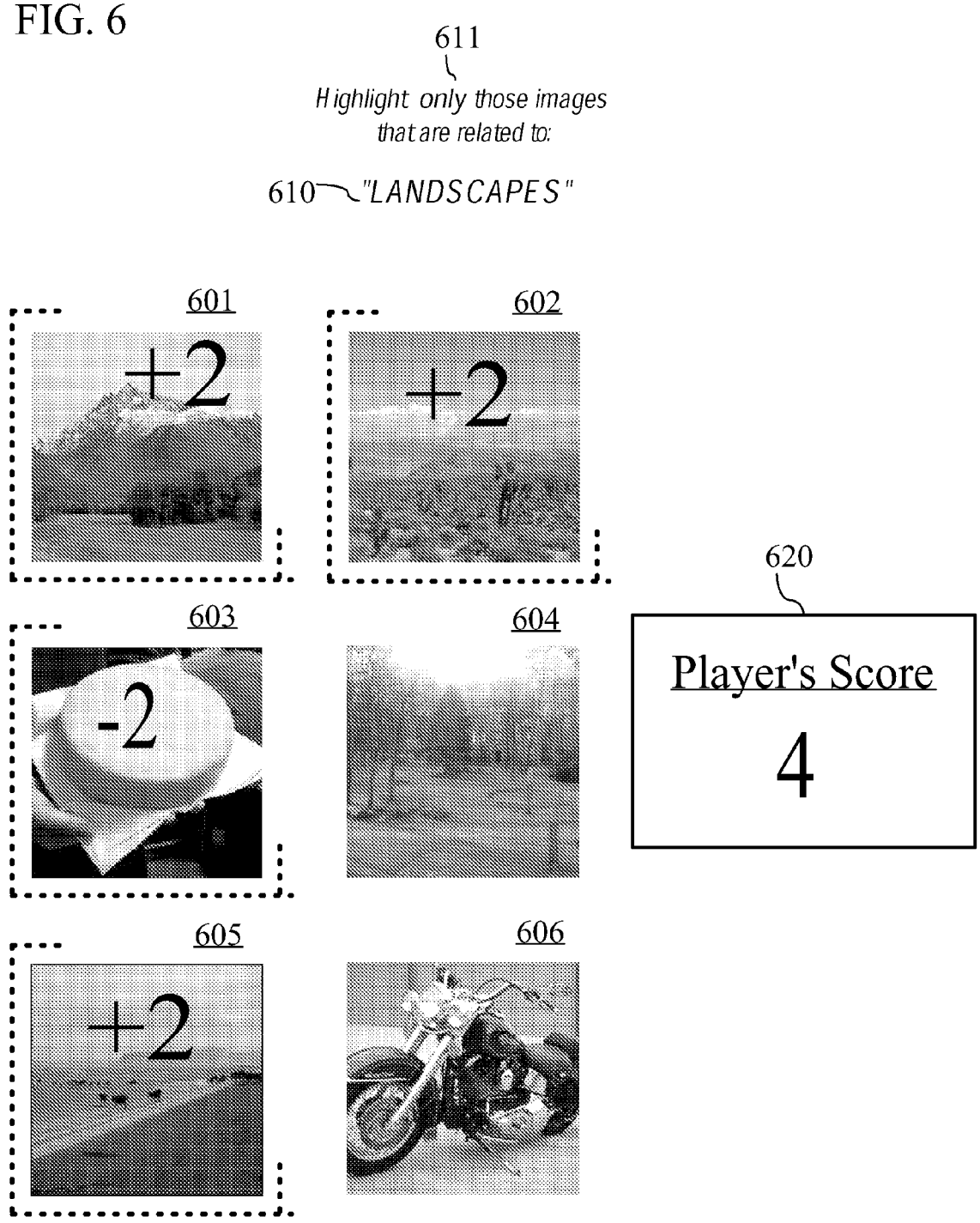

In another embodiment of the invention, the game gives positive marks to a player for images correctly associated with a given tag and negative marks for images incorrectly associated with a given tag based on the known metrics, as illustrated by game application 600 in FIG. 6. Game application 600 gives instructions 611 to the player to highlight all given images that relate to the metadata tag "landscapes" 610. The player playing game application 600 has associated images 601, 602, 603, and 605 with "landscapes." The player has received +2 points for each of images 601, 602, and 605, which are known to depict landscapes, and −2 points for image 603, which is known to depict cheese. These positive and negative marks are displayed to the player and tallied for the player in player's score box 620. In another embodiment of the invention, only negative marks are accrued for images associated with irrelevant metadata. In yet another embodiment of the invention, only positive marks are accrued for images associated with metadata that are known to be relevant to the images. If the player knows that her actions will result in a positive or negative scoring, the player is motivated to accurately select only those images that are relevant to the given tag to associate with the given tag, increasing the accuracy of the relevancy scores associated with true positives.

Introducing noise and a score into the game play can also be used to identify false positives. Players will attempt to avoid associating those images that are not truly related to the given tag with that tag because the players will assume that associating an image with a metadata tag that is not relevant to the image will reduce the players' score. Thus, those images incorrectly tagged with the given tag will rarely or never be chosen as relevant to the tag. For example, if image 606 of FIG. 6 is tagged with the metadata tag "landscapes," but image 606 is very rarely highlighted as relevant to "landscapes" in game application 600, then it can be deduced that image 606 is a false positive with respect to "landscapes."

Games, like game application 600, that give to a player a positive or negative score based on accurate associations of images with given tags induce the player to instinctively select only those images with true relevance to the given tags. Thus, if image 605 is not tagged with the metadata "landscapes," but is frequently selected as relevant to the "landscapes" tag 610, it can be deduced that image 605 is actually relevant to "landscapes," and should be tagged as such (i.e., image 605 is a false negative with respect to the hypothesis that the image cannot be tagged as "landscapes").

In yet another embodiment of the invention, the player is subjected to a time stressor during play of the game. The time stressor may be implemented by giving the player a time limit in which to complete the game, or in which to accrue as many points as possible. In one embodiment of the invention, the player is made aware of the time limit through a timer displayed to the player, non-limiting examples of which are a clock ticking down the seconds, or a graphical representation of time running out.

The player may also be subject to a time stressor by virtue of having multiple players play the game. A player might be pitted against another live player, or might be pitted against the computer. Furthermore, if the game has a limited number of points to be had between the multiple players, then the players are even more stressed to accrue more points than the other players.

When players are subjected to a time stressor, the players will make a more concerted effort to be accurate in creating associations between the given images and the given metadata tags. Also, the players will have less time to study the images. This implies that the players will select only the most obviously relevant images to associate with given tags, and the images selected can be deduced to have a very high relevance to the given tag. For example, if the players of game application 600 of FIG. 6 are subject to a time limit and image 601 is more frequently associated with the metadata tag "landscapes" 610 than the other images 602-606 when the players have little time to respond to the game, then image 601 is regarded as more relevant to "landscapes" than images 602-606.

Furthermore, a player who is stressed for time will avoid those images that the player thinks are unlikely to be relevant to the given tag. For example, in game application 600, players will generally avoid selecting those images that are not obviously relevant to the given tag "landscapes" 610, such as images 603 and 606. Therefore, it can be assumed that if a set of players that are stressed for time associate image 601 frequently with "landscapes," then image 601 is likely relevant to "landscapes," even if image 601 is not tagged with the metadata "landscapes."

Rule 4

Cause Players to Select a Few Images from a Relatively Large Pool of Images

Figure 7:
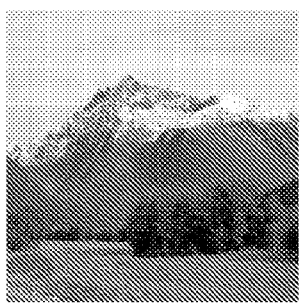
Figure 7:
Figure 7:
Figure 7:
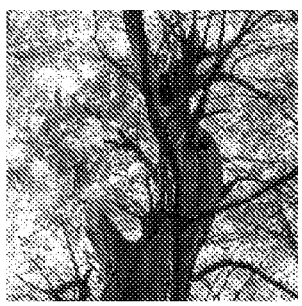
Figure 7:
Figure 7:
Figure 7:
Figure 7:
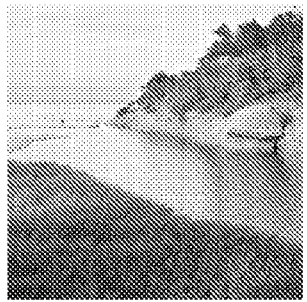
Figure 7:
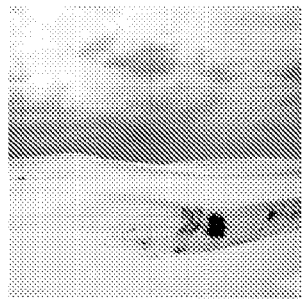
Figure 8:
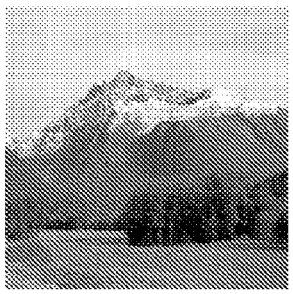
Figure 8:
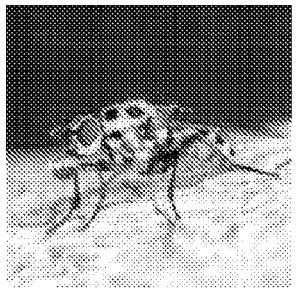
Figure 8:
Figure 8:
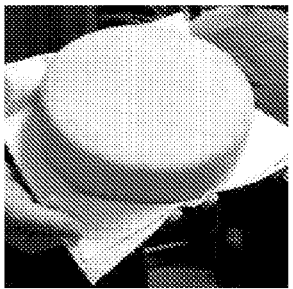
Figure 8:
Figure 8:
Figure 8:
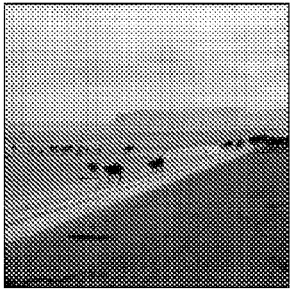
Figure 8:
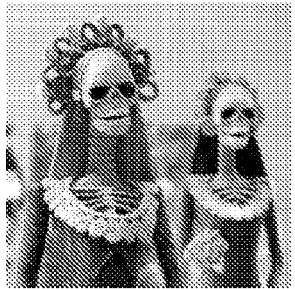
Figure 8:
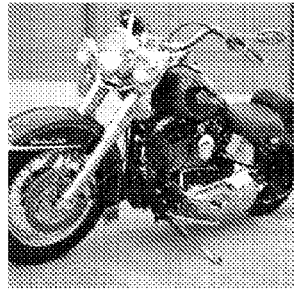

Games designed to make a player associate a small subset of given images to given tags or images encourages the player to associate only those images that are highly relevant to the given tag with the given tag, as illustrated in game application 700 in FIG. 7. Game application 700 gives instructions 711 to highlight only one image that is best related to the given metadata tag "landscapes" 710. In one embodiment of the invention, the player is asked to choose among a set of similar images, for example, images 701-709 of FIG. 7. In another embodiment of the invention, as illustrated by game application 800 of FIG. 8, the player is asked to choose among a set of dissimilar or unrelated images 801-809.

Games conforming to this rule as illustrated by game applications 700 and 800 can be used to improve the relevance score of images that are correctly tagged with relevant metadata, i.e., that are true positives with respect to the images' associated metadata. If in game application 700, which represents a large set of images 701-709 presented to players of a game, image 708 is frequently associated with "landscapes," then image 708 is very likely to be of very high relevance to "landscapes," especially compared to the other images 701-707, and 709.

Such games as 700 and 800 with a large number of images that require the player to associate a small subset of the images with a given tag can be used to improve the instances of false positives. If players of a game application 800 seldom or never associate image 809 with "landscapes," then this behavior implies that image 809 is not relevant to the metadata tag "landscapes," even if image 809 is tagged with that metadata.

Rule 5

Test Player Tolerance

Game applications conforming to the embodiments of the invention can also change the way users perceive an image in order to test the strength of associations between the image and metadata tags. The appearance of an image can be changed by cropping the image, changing particular pixels of the image, fading the image, or increasing/decreasing sharpness, contrast, light, or shadows of the image. For example, in FIG. 9, image 901 has been blurred to image 902 and image 910 has been darkened to image 911. If image 901 has been frequently associated with the given metadata tag "tree," the relevance of this image to the tag "tree" can be tested by blurring the image, as in image 902, and then incorporating image 902 into game applications testing the image's relevance to "tree." If image 902 is still frequently associated with the metadata tag "tree" even when blurred, then image 901/902 is proven to be highly relevant to "tree."

Also, showing a greater or lesser number of images at the same time, or arranging a set of images such that a player has to work to associate a particular image with a given tag, can test the circumstances surrounding an image's association with a given tag. For example, in FIG. 10, if a particular image 1001 has been frequently associated with "horses," and was previously located on the top row 1010 of game application 1000 showing five rows of images 1010-1014, then image 1001 might be moved to the third row 1012 or fourth row 1013, e.g., image 1002. Moving a particular image to the visual middle or bottom of a group of images makes a user's association of the particular image with given metadata more reliable because the user's eye is naturally drawn to images on the outer edge of a group of images. Thus, in FIG. 1000, players are more likely to associate an image in position 1001 with the given metadata tag than an image in position 1002. Therefore, if image 1002 is frequently associated with the metadata tag "horses," then the relevance of the image is proven to be very high.

Figure 9:
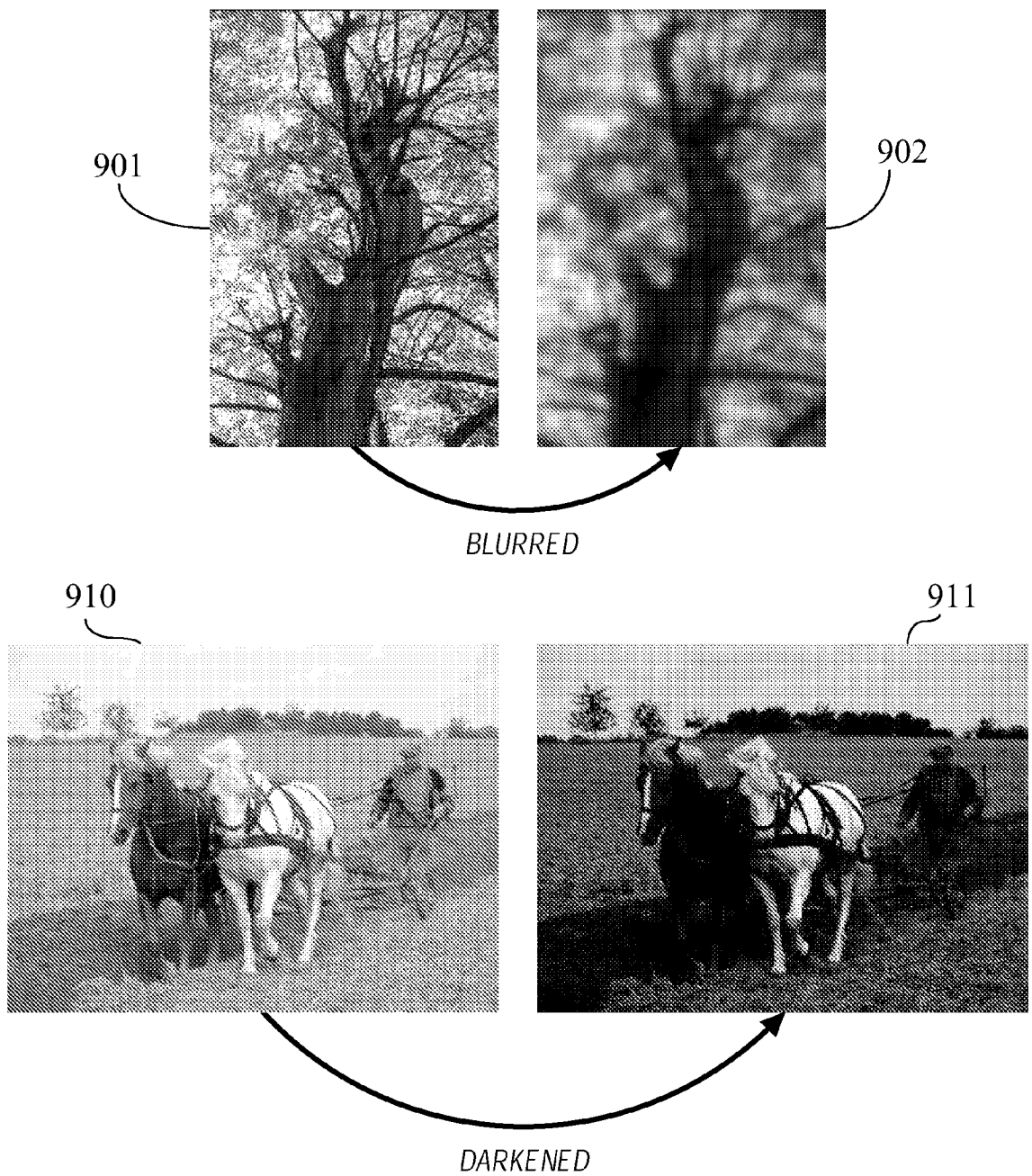
FIG. 9 illustrates two examples of image that have been altered according to the embodiments of the invention.

Games that change an image's appearance by changing the image itself, as in FIG. 9, or by changing the amount of pictures viewed by the players, can be used to test the relevancy of an image to a given tag. For example, if there is evidence that two images are related to "Mount Everest," and after 20-30% fading one of the images is still frequently associated with "Mount Everest" while the other image is no longer associated with the tag, then the game application can safely assume that first image is more relevant to the given tag than the second image is.

Figure 10:
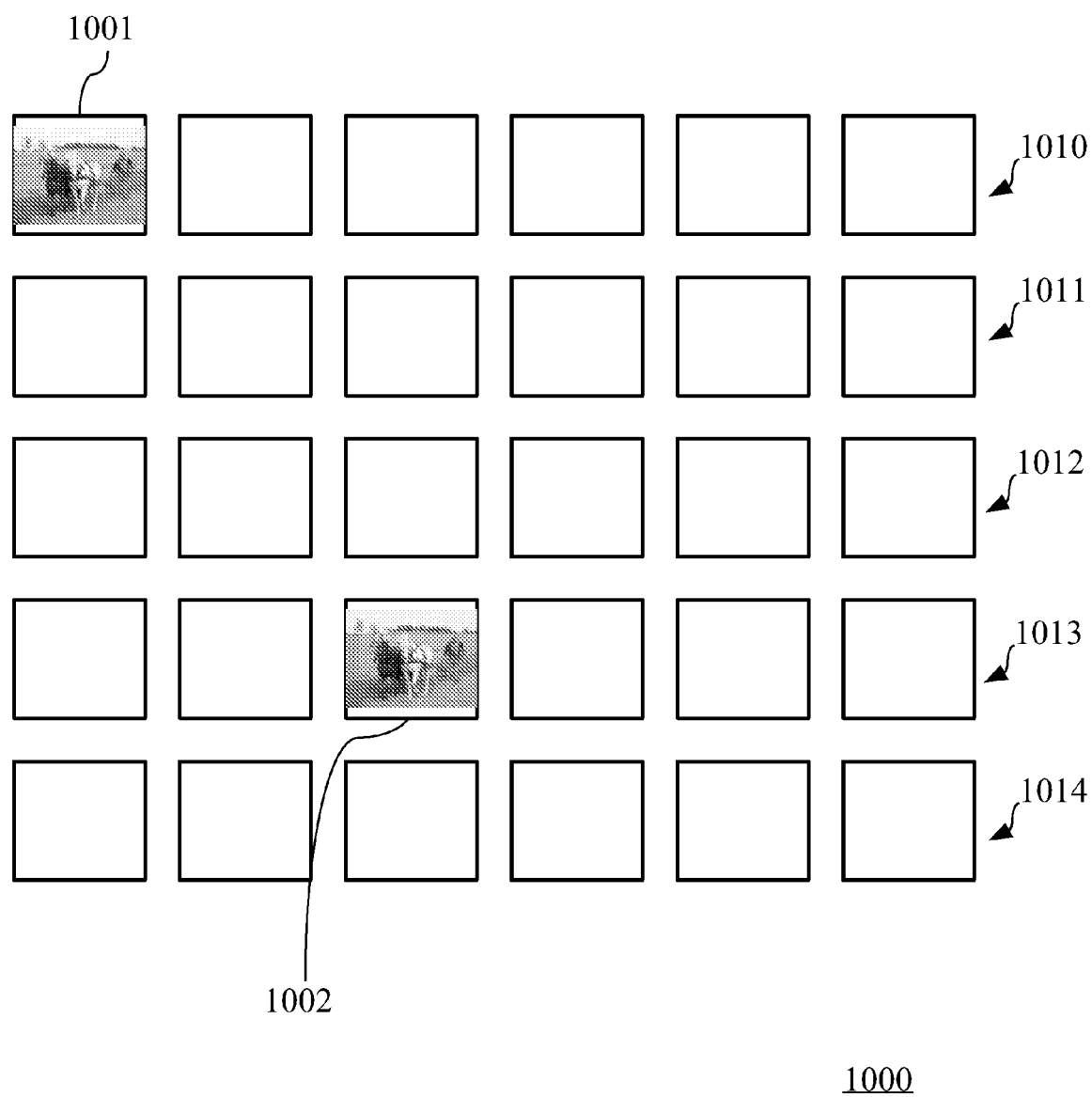
FIG. 10 is an example application illustrating a game application created according to the embodiments of the invention.

Also, if a particular image is buried in the middle of 25 similar images, such as in game application 1000 illustrated in FIG. 10, and a player associates the particular image with a given metadata tag, then the game application can deduce that the particular image is of relatively high relevance to the tag when compared to the other images displayed. Furthermore, as with the other rules, if an image is not tagged with the given metadata tag and is rarely or never associated with the tag by the players of a game conforming to the rules, then the game application can deduce that the image is a true negative.

It will be apparent to those of skill in the art that a particular image can be strategically included in several applications conforming to the embodiments of the invention in order to investigate the particular image's relevance to a number of topics. Furthermore, the examples given above are illustrative and non-limiting, particularly in the manner in which the examples conform to the rules.

Hardware Overview

Figure 11:
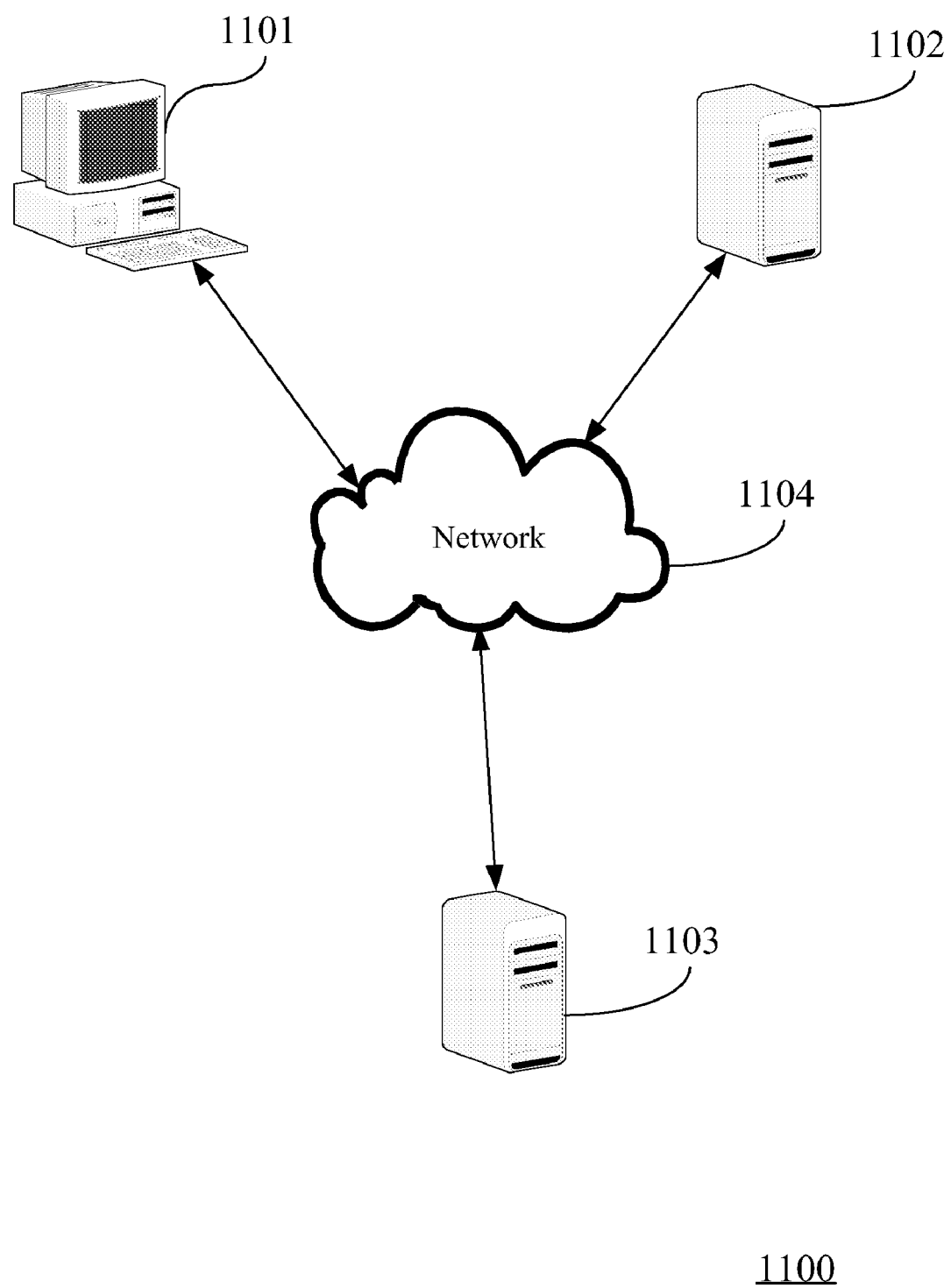
FIG. 11 is a diagram that illustrates a network upon which an embodiment of the invention may be implemented.

One embodiment of the invention may be implemented using network 1100 illustrated in FIG. 11. A game application in accordance with the features of an embodiment of this invention is generated at server 1102. The game application is then loaded onto terminal 1101, via network 1104, where a user plays the game. The results of the user's game play are returned to server 1102, via network 1104, where these results are evaluated. The evaluations of these results are then forwarded, via network 1104, to server 1103, where these results are used to adjust the relevancy of metadata associated with images. A person of skill in the art will readily understand that network 1100 is illustrative of only one configuration on which the embodiments of the invention may be implemented.

Figure 12:
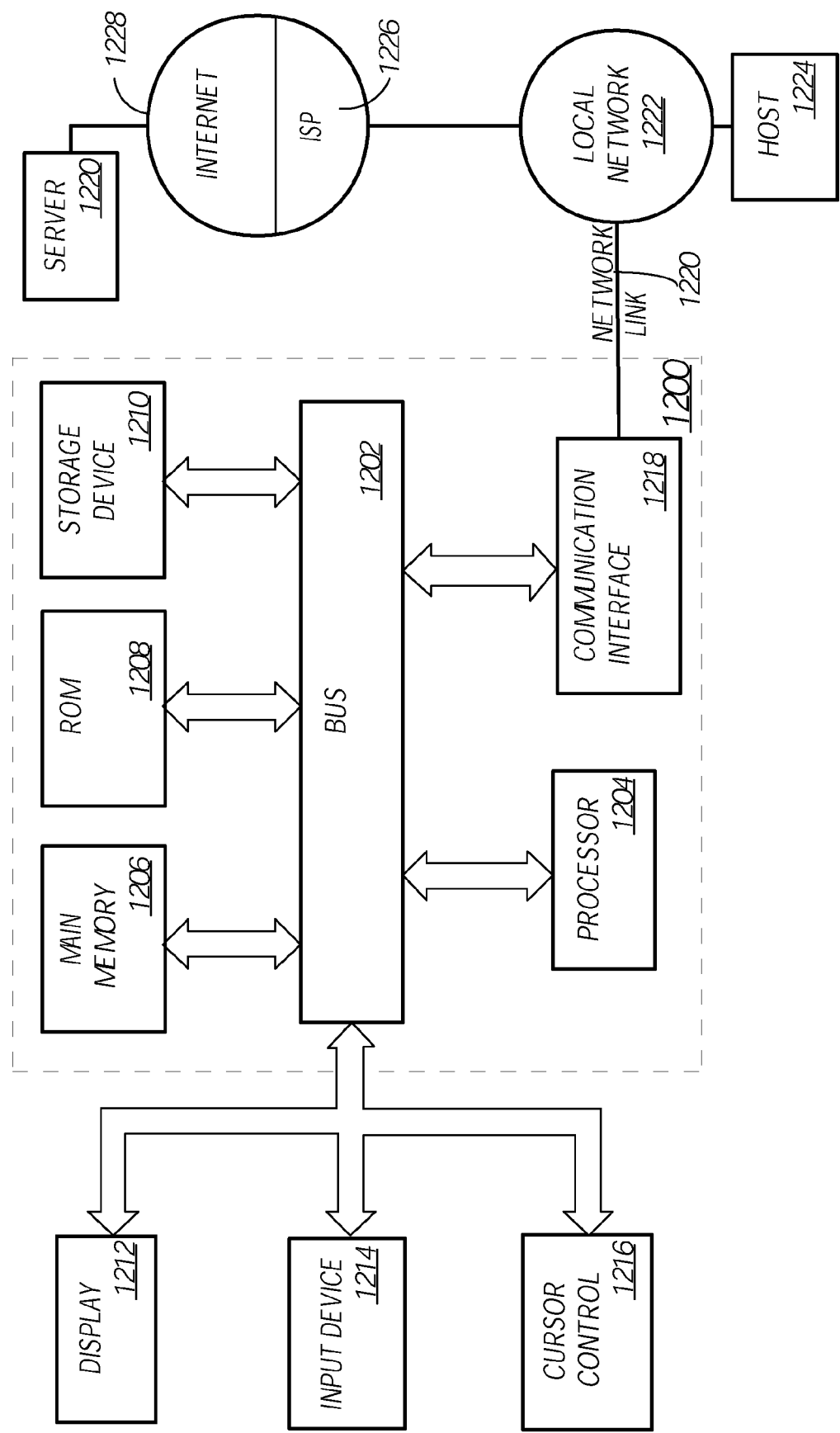
FIG. 12 is a block diagram that illustrates a computer system upon which an embodiment of the invention may be implemented.

FIG. 12 is a block diagram that illustrates a computer system 1200 upon which another embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to storage media and transmission media. Storage media includes both non-volatile media and volatile media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
concurrently displaying, to a first user, a plurality of images;
displaying, to the first user, a metadata tag;
displaying, to the first user, an instruction to select one or more images, of the plurality of images, that are different than the other images, of the plurality of images, relative to the metadata tag;
after displaying the instruction to the first user, receiving, from the first user, user input that selects a particular set of one or more images from the plurality of concurrently displayed images; and
based on the first user having selected the particular set of one or more images, adjusting the relevance level of the metadata tag to at least one of the plurality of images;
wherein the method is performed by one or more computing devices;
concurrently displaying, to the first user, a second plurality of images;
displaying, to the first user, a second metadata tag;
displaying, to the first user, a second instruction to select one or more images, of the second plurality of images, that are different than the other images, of the second plurality of images, relative to the second metadata tag;
after displaying the second instruction to the first user, receiving, from the first user, second user input that selects a second particular set of one or more images from the second plurality of concurrently displayed images; and
in response to the first user having selected the second particular set of one or more images, adjusting a score, for the first user, based on how accurately the user answered the instruction.

2. The computer-implemented method of claim 1 wherein the step of adjusting metadata associated with one or more of the plurality of images based on the first information further comprises:
  determining whether a particular metadata tag of the one or more metadata tags is found in metadata associated with the first image;
  in response to determining that the particular metadata tag is not found in the metadata associated with the first image:
    adding the particular metadata tag to the metadata associated with the first image.

3. The computer-implemented method of claim 1, wherein adjusting the relevance level of the metadata tag to at least one of the plurality of images comprises:
  identifying a particular image, of the plurality of images, that is not in the particular set of one or more images;
  determining whether the metadata tag is found in metadata associated with the particular image an image;
  in response to determining that the metadata tag is found in metadata associated with the particular image:
    lowering a relevancy level of the metadata tag for the particular image.

4. The computer-implemented method of claim 1 further comprising:
  increasing a relevance level of a particular metadata tag of the one or more metadata tags based on a skill level score of the first user;
  wherein the particular metadata tag is found in metadata associated with the first image;
  increasing the skill level score of the first user based, at least in part, on at least one of the following:
    (a) a frequency with which information identifying images has been received from the first user;
    (b) a number of images that the first user has identified as erroneously tagged;
    (c) a number of images that the first user has identified as correctly tagged; and
    (d) a logical connection that exists between visual subject matter of the particular metadata tag and an area of expertise of the first user, wherein the area of expertise of the first user is based on information received from the first user.

5. The computer-implemented method of claim 1 further comprising:
  recording a point total associated with the first user;
  determining whether a relevance level of a particular metadata tag of the one or more metadata tags exceeds a specified threshold;
  wherein the particular metadata tag is found in metadata associated with the first image;
  in response to determining that the relevance level exceeds the specified threshold, adding a quantity of points to the point total; and
  displaying the point total to the first user.

6. The computer-implemented method of claim 5 further comprising:
  imposing a time limit on the first user in which the first information is to be received;
  displaying a status of the time limit to the first user; and
  based on the status of the time limit, adjusting the point total associated with the first user.

7. The computer-implemented method of claim 1 further comprising:
  setting a first relevance level for a first association between the first image and a particular metadata tag of the one or more metadata tags, wherein the first relevance level indicates a relevancy of visual subject matter of the particular metadata tag to the first image;
  displaying, to a second user, the plurality of images;
  displaying, to the second user, the one or more metadata tags;
  instructing the second user to associate one or more of the plurality of images with at least one of the one or more metadata tags;
  receiving, from the second user, second information that indicates the second user's selection of a second image from the plurality of images;
  setting a second relevance level for a second association between the second image and the particular metadata tag, wherein the second relevance level indicates a relevancy of the visual subject matter of the particular metadata tag to the second image;
  displaying, to the first user, a measure of progress for the first user and a measure of progress for the second user;
  if the first relevance level exceeds a specified threshold, increasing the measure of progress for the first user; and
  if the second relevance level exceeds the specified threshold, increasing the measure of progress for the second user.

8. The computer-implemented method of claim 1 further comprising:
  setting a relevance level for a first association between the first image and a particular metadata tag of the one or more metadata tags, wherein the relevance level indicates a relevancy of visual subject matter of the particular metadata tag to the first image;
  displaying, to the first user, a measure of progress for the first user and a simulated measure of progress for a simulated second user;
  if the relevance level exceeds a specified threshold, increasing the measure of progress for the first user; and
  calculating the simulated measure of progress for the simulated second user to impose a time pressure on the first user.

9. The computer-implemented method of claim 1 wherein instructions instructing the first user to associate one or more of the plurality of images with at least one of the one or more metadata tags direct the first user to associate one image of the plurality of images with at least one of the one or more metadata tags.

10. The computer-implemented method of claim 1
  wherein each image of the plurality of images comprises content; and
  wherein the content of each image of the plurality of images is similar to the content of each of a balance of images of the plurality of images.

11. The computer-implemented method of claim 1
  wherein each image of the plurality of images comprises content; and
  wherein the content of a first subset of images of the plurality of images is dissimilar to the content of a second subset of images of the plurality of images.

12. The computer-implemented method of claim 1 further comprising:
  changing a configuration of the plurality of images, wherein the step of changing the configuration comprises at least one of:
    (a) moving a position of an image of the plurality of images; and
    (b) displaying, to the first user, additional images not included in the plurality of images; and changing an appearance of a particular image of the plurality of images, wherein the step of changing the appearance of the particular image comprises performing at least one of:
(a) cropping the particular image;
(b) changing pixels of the particular image;
(c) fading the particular image;
(d) blurring the particular image; and
(e) otherwise modifying the appearance of the particular image.

13. The computer-implemented method of claim 1 wherein metadata associated with the first image comprises:
subject matter information identifying at least one visual subject matter associated with the first image, wherein the subject matter information is provided by a user; and
wherein the subject matter information is used by an image search engine to determine a degree to which the first image is relevant to a search query.

14. The computer-implemented method of claim 1 further comprising:
determining whether the first image has multiple metadata tags associated therewith; and
in response to determining that the first image has multiple metadata tags associated therewith:
calculating a relative relevancy of each of the multiple metadata tags; and
adjusting a relevance level associated with each of the multiple metadata tags according to the relative relevancy of each.

15. The method of claim 1, wherein the step of instructing further comprises instructing the first user to associate one or more of the plurality of images with at least one of the one or more metadata tags that the first user judges to represent a visual subject matter that is opposite to the visual subject matter in the one or more of the plurality of images.

16. The computer-implemented method of claim 1 further comprising:
recording a point total associated with the first user;
determining whether a relevance level of a particular metadata tag of the one or more metadata tags is below a specified threshold;
wherein the particular metadata tag is found in metadata associated with the first image;
in response to determining that the relevance level is below the specified threshold, subtracting a quantity of points from the point total; and
displaying the point total to the first user.

17. The computer-implemented method of claim 1 further comprising determining how accurately the user answered the instruction based, at least in part, on known metrics.

18. A volatile or non-volatile computer-readable storage medium carrying one or more sequences of instructions which, when executed by one or more processors, cause performance of the steps recited in claim 1.

19. A volatile or non-volatile computer-readable storage medium carrying one or more sequences of instructions which, when executed by one or more processors, cause performance of the steps recited in claim 2.

20. A volatile or non-volatile computer-readable storage medium carrying one or more sequences of instructions which, when executed by one or more processors, cause performance of the steps recited in claim 3.

21. A volatile or non-volatile computer-readable storage medium carrying one or more sequences of instructions which, when executed by one or more processors, cause performance of the steps recited in claim 4.

22. A volatile or non-volatile computer-readable storage medium carrying one or more sequences of instructions which, when executed by one or more processors, cause performance of the steps recited in claim 5.

23. A volatile or non-volatile computer-readable storage medium carrying one or more sequences of instructions which, when executed by one or more processors, cause performance of the steps recited in claim 6.

24. A volatile or non-volatile computer-readable storage medium carrying one or more sequences of instructions which, when executed by one or more processors, cause performance of the steps recited in claim 7.

25. A volatile or non-volatile computer-readable storage medium carrying one or more sequences of instructions which, when executed by one or more processors, cause performance of the steps recited in claim 8.

26. A volatile or non-volatile computer-readable storage medium carrying one or more sequences of instructions which, when executed by one or more processors, cause performance of the steps recited in claim 9.

27. A volatile or non-volatile computer-readable storage medium carrying one or more sequences of instructions which, when executed by one or more processors, cause performance of the steps recited in claim 10.

28. A volatile or non-volatile computer-readable storage medium carrying one or more sequences of instructions which, when executed by one or more processors, cause performance of the steps recited in claim 11.

29. A volatile or non-volatile computer-readable storage medium carrying one or more sequences of instructions which, when executed by one or more processors, cause performance of the steps recited in claim 12.

30. A volatile or non-volatile computer-readable storage medium carrying one or more sequences of instructions which, when executed by one or more processors, cause performance of the steps recited in claim 13.

31. A volatile or non-volatile computer-readable storage medium carrying one or more sequences of instructions which, when executed by one or more processors, cause performance of the steps recited in claim 14.

32. A volatile or non-volatile computer-readable storage medium carrying one or more sequences of instructions which, when executed by one or more processors, cause performance of the steps recited in claim 15.

33. A volatile or non-volatile computer-readable storage medium carrying one or more sequences of instructions which, when executed by one or more processors, cause performance of the steps recited in claim 16.

34. A volatile or non-volatile computer-readable storage medium carrying one or more sequences of instructions which, when executed by one or more processors, cause performance of the steps recited in claim 17.

* * * * *